United States Patent [19]

Kohga et al.

[11] 4,320,306
[45] Mar. 16, 1982

[54] METHOD AND APPARATUS FOR CONTROLLING CURRENT OR POWER BETWEEN INTERCONNECTED POWER STATIONS

[75] Inventors: Masayuki Kohga, Tokyo; Shigemitsu Taguchi, Tama, both of Japan

[73] Assignee: Shoei Electric Co., Ltd., Tokyo, Japan

[21] Appl. No.: 109,257

[22] Filed: Jan. 3, 1980

[30] Foreign Application Priority Data

Jul. 13, 1979 [JP] Japan .................................. 54-88950

[51] Int. Cl.³ .............................................. H02J 3/18
[52] U.S. Cl. ...................................... 307/51; 307/20; 307/24; 364/493
[58] Field of Search ....................... 307/51, 84, 19, 20, 307/24; 364/492, 493, 494; 323/102, 119

[56] References Cited

U.S. PATENT DOCUMENTS 3,117,221  1/1964  Kirchmayer .................... 364/493 X

OTHER PUBLICATIONS

Dopazo et al.; State Calculation of Power Systems from Line Flow Measurements; from IEEE Transactions on Power Apparatus and Systems; vol. Pas. 89, No. 7; Sep./Oct. 1970.

"Standard Handbook for Electrical Engineers," Fink et al., 11th edition, 16-2-16-47 and 14-33-14-37 and 14-16-14-33.

Primary Examiner—L. T. Hix
Assistant Examiner—James L. Dwyer
Attorney, Agent, or Firm—Armstrong, Nikaido, Marmelstein & Kubovcik

[57] ABSTRACT

A method and apparatus for controlling a current and-/or power between interconnected power stations.

A deviation from a base load in an active current or power flowing out of a power station and a deviation from a normal value in the terminal voltage of the power station are measured. A linear function of the ratio of the voltage deviation to the active current deviation is obtained, and a product of the active-current to voltage deviation function and an active current flowing out of the power station is calculated, and thus a reactive current is defined by the product.

An internal generation current of the power station is controlled so as to coincide substantially with the sum of the current composed of the active current and the reactive current defined above, and other currents of the power station including the internal load current.

14 Claims, 14 Drawing Figures

METHOD AND APPARATUS FOR CONTROLLING CURRENT OR POWER BETWEEN INTERCONNECTED POWER STATIONS

BACKGROUND OF THE INVENTION

This invention relates to a method and an apparatus for controlling the voltage magnitude and reactive power at a power plant and/or power substation connected to an electric power system.

The increase of power demand has constrained the growth of power generation to precede, so that a modern electric power system has been steadily advancing in size and capacity. In addition, transmission lines have extraordinarily increased in number and length, since a multiplicity of power plants and load centers have been scattered all over the service area.

As well known, an electric power system is an aggregation of power facilities for generation, transmission and distribution, in which various types of power plants such as hydraulic, thermal and nuclear are located in disorder and interconnected in complexity. This is one material reason why a modern power system has been possessed by the complicated characteristics.

The operation of a modern power system, it is apparently believed, has been successfully carried out by the aid of signal facilities for communication, telemetering, supervisory, remote control, protective relaying and automatic control, in which controls of generation, frequency, voltage and power flow are included.

The generation control, or the demand and supply operation of a power system, performs an important function in a rough regulation of the system frequency, by which the generation of power plants is adjusted in accordance with ever-changing load conditions so as to maintain the system frequency within a prescribed range.

Fine regulation of the system frequency is carried out mainly by speed governors with which most of hydraulic and thermal power plants are equipped. According to a recommendation, frequency variations whose period lies between 2 and 20 minutes, might be absorbed by the so-called load-frequency control plants, and further, frequency deviations lasting for more than 20 minutes should be taken care of by the so-called load-dispatch control plants.

As shown in "Standard Handbook for Electrical Engineers," Donald G. Fink, H. Wayne Beaty, eleventh edition, 16-2-16-47, power flow control is an essential need for the prevention against overload of power equipments, the reduction of transmission losses and the control of system voltage, including the regulation of an active and a reactive power at individual power plants, the modification of network by switching of power plants and substations as well as transmission lines, and the regulation of reactive power at phase-modifying equipments or reactive power suppliers.

As shown in "Standard Handbook for Electrical Engineers", 14-33–14-37, control of the system voltage is carried out mainly by automatic voltage regulators with which most of power plants and substations are equipped, while supplementarily by power-flow control system varying the reactive power output of Var-compensating equipments such as power capacitors, shunt reactors, on-load tap-changing transformers and synchronous capacitors.

All of the above-mentioned controls are exercised in compliance with informations furnished by the characteristics of frequency and voltage variations as well as decisions derived from the nature of loads and the experience of operations, which have been based on the past records at suitable nodes of the power system.

In general, the load dispatch control referred to as generation allocation is esteemed to act prior to other controls. For that reason, considerable attentions have so far devoted to the control of active power, but not to the controls of voltage and reactive power regardless of their importance to system operations.

Actually, as shown in the above described "Standard Handbook for Electrical Engineers," 14-16–14-33, untolerable difficulties in the operation of a modern power system may be derived from the lack of considerations on reactive power and voltage control channel. Furthermore, in transmission networks every node voltage is affected more severely by reactive power flows than by active power flows and the magnitude of voltage variation depends dominantly on the network impedances.

It is quite necessary for system operations, therefore, to exactly grasp the voltage and reactive power characteristics.

The reactive power output of a phase-modifying equipment depends on the location where it is installed in the network, and the condition under which it is interconnected with power plants, substations and other phase-modifying equipments.

The so-called matrix equation is particularly useful in calculating the power flows in a linear impedance network. But because of matrix whose dimension increases along with the number of nodes in the network, a large-scale power system is restricted by dimension in power-flow calculations even by means of digital computers. Furthermore, actual power systems are provided with nonlinear characteristics to make the system operations inconvenient. Especially, fluctuations in node voltages are injurious to power-flow calculations based on matrix equations, whereas for the sake of simplification in system operations the so-called constant power-factor operation is inevitablly applied to small-capacity hydraulic power plants which are subject to variations of the system voltage and provided with the amount of reactive power not enough to regulate the system voltage.

The objective of power-flow calculations is to analyze the power transfers in a transmission network which is expressed in terms of impedance or admittance. Until the late 1950s ac network analyzers were much used as analog models for solving power-flow problems, but because of the imperfectness of the analog simulation any useful results could be scarcely obtained. In the 1960s digital computers were placed at the service of power-system analyses, but the formulation of power-system performances remains as incomplete as ever, which includes the characteristic equations of generator units equipped with speed-governing and voltage-regulating systems.

Power-system stability is an important problem for system engineers to solve, which is associated not only with the loss of a large-capacity power plant forcing other power plants and thus the power system to overload but also with the leading-phase operation of thermal power plants causing themselves to be in unstable conditions.

There is a method of solving steady-state stability limits in terms of phase angles between terminal voltages of lines, internal voltages of machines or an internal voltage and a terminal voltage. The solutions, however, would be substantially incorrect because of neglecting the effects of control actions on generator performances. Besides, it might be quite impractical to analyze the dynamical stability of a voltage-regulated power plant operating in parallel with an infinite bus.

On the whole, theoretical approaches to power-system performances have so far been made on condition that the relations between power-system components are simplified and the operating characteristics of individual components are linearized. All of the results, therefore, should be inapplicable to actual power systems characterized essentially by large-scale and complexity.

SUMMARY OF THE INVENTION

Accordingly, an object of the present invention is to eliminate the above-mentioned disadvantages of the conventional method and apparatus for controlling the current or power between interconnected power stations.

The present inventors have derived a theory necessary and sufficient for exactly analyzing the steady-state behaviors of power systems from the theoretical development of the well-known equations describing the generator performances with both of the operating characteristics of speed-governing and voltage-regulating systems.

The present invention is intended for providing a method and an apparatus enabling one to control the cross current or reactive power flowing between power-system components and thereby to operate the power system at will and with simplicity, and particularly for providing a method and an apparatus enabling one to exert the automatic control of system voltages with high accuracy and stability and thereby to carry on the power-system operations with the least trouble. According to the theory developed here, the precise control of cross currents results in the reasonable operation of power systems.

DESCRIPTION OF THE PREFERRED EMBODIMENTS

Prior to explanation of embodiments of the invention, principal of the invention will be described below.

Figure 1:
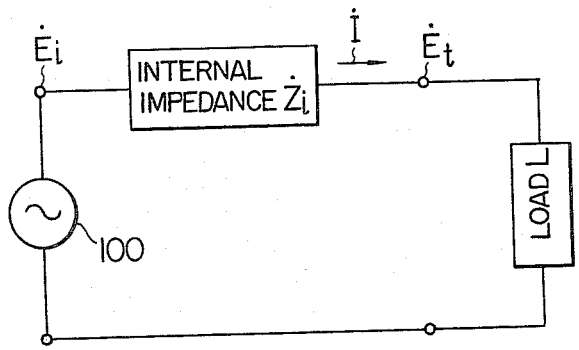
FIG. 1 is an equivalent generator circuit for explaining the operation of a power plant.

In a power plant or turbine-generator unit, as well-known, as the generator rotates with energy of water or steam flowing into the turbine, the magnetic flux linking the armature winding changes cyclically, and AC voltage is continuously generated in the armature winding. Thus, as shown in the equivalent generator circuit of FIG. 1, the supply current $\dot{I}$ is applied from a power source 100 to a load L through an internal impedance $\dot{Z}o$ existing between the internal voltage $\dot{E}i$ and the terminal voltage $\dot{E}t$. In the case of steady-state movements of the turbine, the generator-driving power Pm due to water or steam flowing into the turbine is equal to the consumed power of the turbine-generator unit which is expressed in terms of the sum of the generator output power and the power loss due to the internal resistance.

The driving power Pm and the internal-voltage magnitude Ei are regulated respectively by means of a speed governor provided with a function, or approximately with a linear function, of the deviation in angular speed or frequency $\Omega$ and by means of a voltage regulator provided with that of the deviation in terminal-voltage magnitude Et.

Accordingly, it is known that, in taking the terminal voltage Et as the reference, a set of four equations pertaining to the current characteristics of a power plant is obtained as follows;

$$\dot{I}i = \dot{I}f + \dot{I} \qquad (1)$$

$$Ip = Im - (I^2 \cdot Ri/Et) \qquad (2)$$

$$Im = Imo + H\omega(\Omega r - \Omega) \qquad (3)$$

$$Ii = Iio + Hv(Er - Et) \qquad (4)$$

where
  $\dot{I}i$, Ii: internal generation current and its magnitude of power plant $$\dot{I}i = \frac{\dot{E}i}{\dot{Z}i} = Ii\,\epsilon^{-j(\Gamma i - \Phi i)}$$

$\dot{I}f$, If: internal load current and its magnitude of power plant $$\dot{I}f = \frac{\dot{E}t}{\dot{Z}i} = If\,\epsilon^{-j\Gamma i}$$

$\dot{I}$, I: supply current and its magnitude of power plant
  Ip: active component of $\dot{I}$ or active supply current of power plant
  Im: driving current of power plant or current equivalent for driving power Pm of rotating body $$Im = Pm/Et$$

Imo, Iio: current equivalents for steady-state terms Pmo, Eio of speed governor and voltage regulator $$Imo = Pmo/Et$$

$$Iio = Eio/Zi$$

Hω, Hv: current equivalents for transfer functions Gω, Gv of speed governor and voltage regulator $$H\omega = G\omega/Et$$

$$Hv = Gv/Zi$$

Ωr, Er: angular-frequency reference and voltage reference
Zi: internal impedance of power plant
Ri: internal resistance of power plant
Φi: phase angle of Ei or internal phase angle difference of power plant
Γi: phase angle of Zi For the convenience of expressions the per unit system is employed in the present invention.

In case of two power plants connected to a common node, the foregoing set of equations (1)–(4) are obtained for a power plant while the following set of equations (1')–(4') for the other power plant;

$$\dot{I}i' = \dot{I}f' + \dot{I}' \tag{1'}$$

$$Ip' = Im' - \frac{(I')^2 Ri'}{Et} \tag{2'}$$

$$Im' = Imo' + H\omega' (\Omega r - \Omega) \tag{3'}$$

$$Ii' = Iio' + Hv' (Er - Et) \tag{4'}$$

The supply currents $\dot{I}$, $\dot{I}'$ can be generally expressed in terms of the currents Il, Il' flowing into a common load and the currents Ic, Ic' interflowing between the power plants;

$$\dot{I} = \dot{I}l + \dot{I}c \tag{5}$$

$$\dot{I}' = \dot{I}l' + \dot{I}c' \tag{5'}$$

$$\dot{I}c + \dot{I}c' = 0 \tag{6}$$

Figure 2:
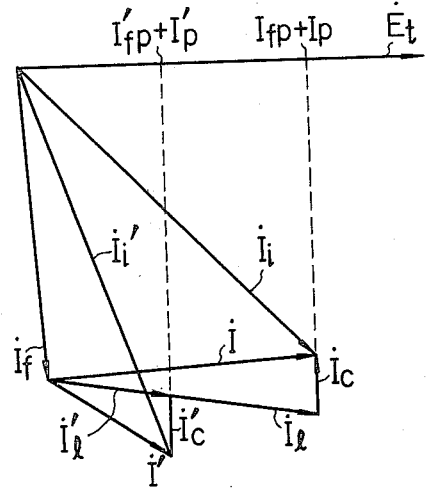
FIG. 2 is a phasor diagram for explaining the operation of the circuit of FIG. 1.

In Eq. (1) each current is decomposed into active and reactive components, and then, all of the phase angles thereof are eliminated, and further, in Eqs. (1) and (2) both of the active component of internal load current, Ifp, and the internal loss current (I²·Ri/Et) are neglected for simplicity because the internal resistance Ri is extremely small in general, thereupon the relationship of Eq. (7) can be derived from Eqs. (1) and (2). It is clearly seen from Eq. (7) that the conditions for satisfying the relationship of Eq. (8) are not always coincident to the conditions for satisfying that of Eq. (9) which implies the supply currents $\dot{I}$ and $\dot{I}'$ to be in phase, that is, the conditions necessary for making no cross current exist in the interconnected power plants. In other words, it is essentially difficult to control the cross current Ic by means of the conventional speed governor and voltage regulator provided with the control characteristics of Eqs. (3) and (4);

$$1 + \left(\frac{Ifq + Iq}{Ip}\right)^2 = \left(\frac{Ii}{Im}\right)^2 \tag{7}$$

$$\frac{Ii}{Im} = \frac{Ii'}{Im'} \tag{8}$$

$$\frac{Iq}{Ip} = \frac{Iq'}{Ip'} \tag{9}$$

where
Ip, Iq: active and reactive components of $\dot{I}$ or active- and reactive supply currents
Ifq: reactive component of $\dot{I}f$ For convenience of illustration, an interconnection of two power plants is considered, whose internal load currents $\dot{I}f$ and $\dot{I}f'$ are identical with each other and whose voltage regulator is provided with the control characteristics of Eq. (4) in common with each other. Both of the internal generation current magnitudes Ii and Ii' are adjusted to the common values all the times as far as the voltage deviation (Er−Et) is detected in both of the power plants, and it is only natural, therefore, that the cross currents $\dot{I}c$ and $\dot{I}c'$ should be generated in proportion to the difference between active supply currents Ip and Ip', as seen in the phasor diagram of FIG. 2.

According to Eqs. (1)–(4) the internal generation current Ii is determined by both of the active component dependent on the speed governor characteristics and the magnitude dependent on the voltage regulator characteristics, so that the voltage regulation results in varying the reactive component of internal generation current $\dot{I}i$, hence the reactive supply current Iq.

From the practical viewpoint of voltage regulation, the cross current $\dot{I}c$ or $\dot{I}c'$ existing in interconnected power plants is composed of reactive component only and expressed as follows;

$$\dot{I}c = Ic \, \epsilon^{-j\frac{\pi}{2}} \tag{10}$$

$$\dot{I}c' = -Ic' \, \epsilon^{-j\frac{\pi}{2}} \tag{10'}$$

The present invention is intended to provide a method and an apparatus for controlling the reactive supply current Iq and thus the cross current Ic by manipulating the voltage regulator system of a power plant, has been developed and established on the base of the above-mentioned considerations.

It is perfectly possible for a power plant connected to a node whose voltage is denoted by $\dot{E}n$ to define the active-current to voltage deviation λ of Eq. (11) as a characteristic function of the supply current $\dot{I}$, and to express it in terms of the voltage deviation (Er−En) divided by the active-current deviation factor δ representative of the proportion of a deviation to the maximum deviation in active supply current Ip or power P.

In case of two power plants connected to a common node, assuming the current components Idq and Idq' to satisfy Eq. (12), the relationships between the reactive load currents Ilq, Ilq' and between the current components Idq and Idq' could be represented by Eq. (13) in reference to the relationship between the active supply currents Ip, Ip'.

Furthermore, Eq. (14) is valid for the sum of the load currents $\dot{I}l$ and $\dot{I}l'$, so that Eq. (15) is derived from Eqs.

(13) and (14). Besides, in replacing the active-current deviation factor δ by a first-order function of the angular frequency deviation (Ωr−Ω), the frequency to voltage deviation ratio λω of Eq. (11a) may be defined as another characteristic function of the supply current İ. Here λω is available in Eq. (12a) as λ in Eq. (12);

$$\lambda = \mu \frac{Er - En}{\delta} \qquad (11)$$

$$\frac{Idq}{Ip} = \frac{Idq'}{Ip'} = -\lambda \qquad (12)$$

$$\frac{Idq'}{Idq} = \frac{Ip'}{Ip} = \frac{Ilq'}{Ilq} \qquad (13)$$

$$Idq + Idq' = Ilq + Ilq' \qquad (14)$$

$$Idq = Ilq \qquad (15)$$

$$\lambda\omega = \mu\omega \frac{Er - En}{\Omega r - \Omega} \qquad (11a)$$

$$\frac{Idq}{Ip} = \frac{Idq'}{Ip'} = -\lambda\omega \qquad (12a)$$

where
- λ, μ: function of active-current to voltage deviation ratio or active-current to voltage deviation function and its regulative coefficient
- δ: active-current deviation factor δ=(Ip−Ipo)/(Ipmax−Ipo)
- Idq: reactive supply current having no cross current or zero-cross reactive supply current
- Ilq: reactive load current
- Ipmax, Ipo: maximum and reference of active supply current
- Ėn, En: node voltage or load-center voltage and its magnitude
- λω, μω: function of frequency to voltage deviation ratio or frequency to voltage deviation function and its regulative coefficient From Eq. (15) it is seen that the condition necessary and sufficient for preventing the cross current Ic from existing in interconnected power plants, that is, the zero-cross-current condition for each of the interconnected power plants is completed by a pair of Eqs. (11) and (12) or (11a) and (12a).

Figure 3:
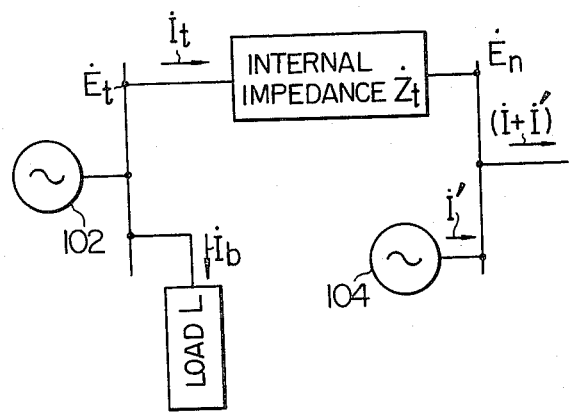
FIG. 3 is an equivalent generator circuit for explaining the principal of the present invention.

A more practical consideration follows, applying the zero-cross-current condition to a power plant connected to a power system through a transmission line having impedance Żt, as shown in FIG. 3. In employing the terminal voltage Ėt and the node voltage Ėn as individual reference, the transmission-line current is defined as the transmission current İt at the sending end and as the supply current İ at the receiving end of the transmission line, respectively.

According to this definition, voltages and currents have the following relationships;

$$\dot{Ii} = \dot{If} + \dot{Ib} + \dot{It} \qquad (16)$$

$$Im = \frac{|\dot{Ib} + \dot{It}|^2 \cdot Ri}{Et} + Ibp + Itp \qquad (17)$$

$$Itp = \frac{En}{Et} Ip + \frac{It^2 \cdot Rt}{Et} \qquad (18)$$

$$Itq = \frac{En}{Et} Iq - \frac{It^2 \cdot Xt}{Et} \qquad (19)$$

$$En = |\dot{Et} - \dot{It} \cdot \dot{Zt}| \qquad (20)$$

where
- İb, Ibp: branch current and active branch current
- İt: transmission current
- Itp, Itq: active- and reactive transmission current
- Żt, Rt, Xt: impedance, resistance and reactance of transmission line $$\dot{Zt} = Rt + jXt$$

Figure 4:
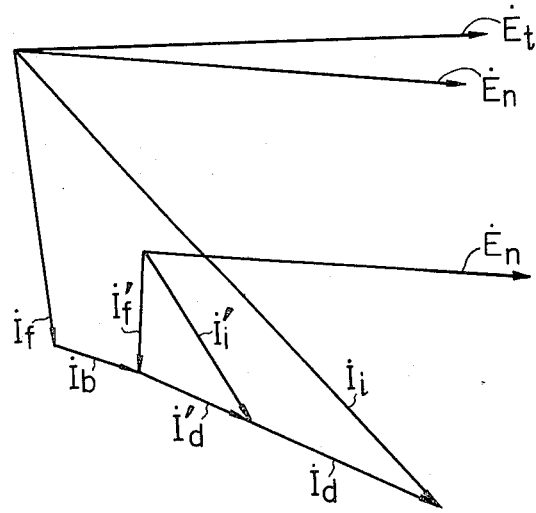
FIG. 4 is a phasor diagram for explaining the operation of the circuit of FIG. 3.

Denoting the zero-cross transmission current İdt, which is required to deliver the zero-cross supply current İd to the load center over the transmission line as seen in the phasor diagram of FIG. 4, and substituting the active supply current Ip of Eq. (18) and the reactive supply current Iq of Eq. (19) into the current components Ip and Idq of Eq. (12), that is, the zero-cross-current condition for a power plant, the expressions for zero-cross transmission current İdt are derived, as shown in Eqs. (21) and (22). Consequently, when the internal load current İf and the branch current İb are given and the zero-cross transmission current Idt of Eq. (22) is substituted into the transmission current İt of Eq. (16), it is possible to obtain the internal generation current İi requisite for the purpose of preventing the current Ic from existing at the load center or the receiving end of the transmission line;

$$Idtq + \frac{Idt^2 \cdot Xt}{Et} = -\lambda \left( Itp - \frac{Idt^2 \cdot Rt}{Et} \right) \qquad (21)$$

$$\dot{Idt} = Itp + Idtq e^{j\frac{\pi}{2}} \qquad (22)$$

where
- İdt: zero-cross transmission current
- Idtq: reactive component of İdt or zero-cross reactive transmission current It should be seen from Eq. (20) that the terminal voltage Ėt at the power plant delivering the zero-cross transmission current İdt is adjusted to a value different from the node voltage Ėn at the load center by the voltage drop İdt·Żt.

Figure 5:
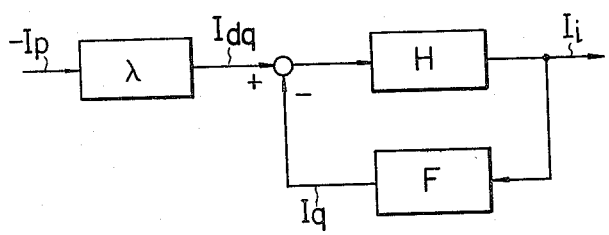
FIG. 5 is a block diagram of a control system for explaining the principal of the present invention.

On the other hand, in using a control system whose block diagram is shown in FIG. 5 and whose characteristic is function represented by Eq. (23), it is possible to produce the internal generation current İi requisite for the purpose of preventing the cross current Ic from existing in interconnected power plants or for the purpose of making the supply current İ coincident with the load current İl without any informations on the internal load current İf as well as on the branch current İb. Employing the control system of FIG. 5, however, in which the transfer function λ is given by Eq. (11) or (11a) and the transfer function F is derived from Eq. (16), the control error Ic of Eq. (24) is to act as a cross current;

$$Ii = H(Idq - Iq) \qquad (23)$$

$$\frac{Ic}{Idq} = \frac{1}{1 + F \cdot H} \qquad (24)$$

where
H: transfer function of control element

F: transfer function of generation circuit $$F = \frac{\frac{Et}{En} Itq + \frac{It^2 \cdot Xt}{En}}{Ifq + Ibq + Itq} \sin(\Gamma i - \Phi i) \quad (24)$$

A power plant which operates under the zero-cross-current condition of Eqs. (11) and (12) is all the time provided with the negative-feedback control characteristics independently of whether the load current $\dot{I}l$ is leading or lagging, since the zero-cross reactive supply current Idq is proportional to the voltage deviation (Er−En) and identical with the reactive supply current Iq in sign.

Especially, the cross current due to the control error Ic, as seen from Eq. (24), is negligible for a power plant whose loop transfer function (F·H) is provided with a sufficiently high gain under the rated-load condition.

It should be noted also that both of Eqs. (25) and (26) are equivalent to Eq. (24) in the characteristics of the control element, since both magnitude and phase angle of the zero-cross supply current Id are easily obtainable of the active supply current Ip and the zero-cross reactive supply current Idq;

$$Ii = H\left(\sqrt{Ip^2 + Idq^2} - I\right) \quad (25)$$

$$Ii = H\left(\tan^{-1}\frac{Idq}{Ip} - \Phi\right) \quad (26)$$

where

Φ: phase angle of supply current $\dot{I}$

Denoting the transfer function of every control element by H and that of the generation circuit from the internal generation current magnitude Ii as well to the supply current magnitude I as to the phase angle of supply current $\dot{I}$ by F, the block diagram of FIG. 5 is valid also for both of the control systems to which the characteristics of Eqs. (25) and (26) are applied. It is necessary for the control system, however, on which the characteristics of Eq. (25) is imposed, to change the sign of the transfer function H according to that of the zero-cross reactive supply current Idq having a pair of positive and negative values to be solved so that the control system may be kept in negative-feedback characteristics.

In a power system where two power plants are connected to a common node, it is possible to make the reactive supply currents Iq and Iq' depend on the active supply currents Ip and Ip' respectively by using Eqs. (27) and (27') in which the active-current to voltage deviation function λ and λ' are based on the assumptions that the active-current deviation factors δ and δ' are identical with each other and that the active-current to voltage deviation regulative coefficients μ and μ' as well as the voltage references Er and Er' are respectively different from each other. In this case, the cross current Ic as expressed by Eq. (28) is generated due to the active and reactive supply current characteristics of Eqs. (27) and (27');

$$\frac{Idq + Ic}{Ip} = -\mu \frac{Er - En}{\delta} \quad (27)$$

$$\frac{Idq' - Ic}{Ip'} = -\mu' \frac{Er' - En}{\delta} \quad (27')$$

$$\frac{Ic}{Idq} = -\frac{1 - \frac{\mu}{\mu'} \frac{Er - En}{Er' - En}}{1 + \frac{\mu}{\mu'} \frac{Er - En}{Er' - En} \frac{Ip}{Ip'}} \quad (28)$$

Equation (28) represents the cross current Ic interflowing between the power plants each of which operates in a state out of the zero-cross-current condition. If the regulative coefficents μ and μ' as well as the voltage references Er and Er' are respectively readjusted to be equal to each other, then both of the power plants restored in the zero-cross-current state.

In applying a difference between the regulative coefficients μ and μ' to the two-plant system operating in the zero-cross-current state, the mean regulative coefficient μs of Eq. (29) and thereby the cross current Ic of Eq. (30) or (30') are obtained. On the other hand, in applying a difference between the voltage references Er and Er' to the two-plant system operating in the zero-cross-current, the mean voltage reference Ers of Eq. (31) and thereby the cross current Ic of Eq. (32) or (32') are derived;

$$\mu s = \mu \frac{Ip}{Ip + Ip'} + \mu' \frac{Ip'}{Ip + Ip'} \quad (29)$$

$$\frac{Ic}{Idq} = -\frac{\mu - \mu s}{\mu s} \quad (30)$$

$$\frac{Ic}{Idq'} = \frac{\mu' - \mu s}{\mu s} \quad (30')$$

$$Ers = Er \frac{Ip}{Ip + Ip'} + Er' \frac{Ip'}{Ip + Ip'} \quad (31)$$

$$\frac{Ic}{Idq} = \frac{Er - Ers}{Ers - En} \quad (32)$$

$$\frac{Ic}{Idq'} = -\frac{Er' - Ers}{Ers - En} \quad (32')$$

where

μs: mean regulative coefficient

Ers: mean voltage reference

As seen from Eqs. (29) and (31), the cross current Ic which interflows between the power plants designed to make the reactive supply currents Iq and Iq' dependent respectively on the active supply currents Ip and Ip' is proportional to the weighted average of the regulative coefficients μ and μ' or the voltage references Er and Er' with the allotment ratios of active loads {Ip/(Ip+Ip')} and {Ip'/(Ip+Ip')}, to be taken as the weighting coefficients. In power systems, thus, a power plant having a smaller-capacity relative to that of the other power plant interconnected therewith might be forced to fall into overload due to the cross current Ic, since the deviation in a regulative coefficient, (μ=μs), or in a voltage reference, (Er−Ers), should be larger all the time.

In case of a two-plant system where the so-called speed-governed and voltage-reguleted power plant equipped with conventional control systems is connected to the load-center node as the other power plant, the active and reactive supply current characteristics correspondent to Eq. (27') is derived from Eqs. (1') and (4') into which Imo'=0 and Et=En are substituted as well as Eq. (11a), so that the expressions for the voltage reference Er' and the frequency to voltage deviation regulative coefficient $\mu\omega'$ of the conventional power plant are obtained as follows;

$$Er' = Er + \frac{Ifq' \cosec(\Gamma i' - \Phi i') - Iio'}{Hv'} \quad (33)$$

$$\mu\omega' = \frac{Hv'}{H\omega'} \sin(\Gamma i' - \Phi i') \quad (34)$$

According to Eqs. (28), (33) and (34), when the speed governor and the voltage regulator are designed to satisfy the equation (35) with the steady-state term Iio' of the voltage regulator as well as the equation (36) with the transfer functions $H\omega'$ and $Hv'$ of the speed governor and the voltage regulator, then the conventional speed-governor and voltage-regulated power plant is equivalent in operating characteristics to the power plant designed to make the reactive supply current Iq dependent on the active supply current Ip by using the frequency to voltage deviation function $\lambda\omega$ of Eq. (11a). In general, however, it is too difficult to simultaneously satisfy both conditions of Eqs. (35) and (36), that is, to maintain the zero-cross-current state in a power system with which a conventional speed-governor and voltage-regulated power plant is interconnected;

$$Iio' = Ifq' \cosec(\Gamma i' - \Phi i') \quad (35)$$

$$\frac{Hv'}{H\omega'} = \mu\omega \cosec(\Gamma i' - \Phi i') \quad (36)$$

Taking the internal phase angle $\Phi i$ to be 0 to $(\pi/4)$ radians, it is derived from Eq. (34) that the frequency to voltage deviation regulative coefficient $\mu\omega'$ corresponds approximately to a value ranging from 1.0 to 0.7 times the gain ratio $(Hv'/H\omega')$ of the speed governor to the voltage regulator. Consequently, for a power plant equipped with the speed governor whose steady-state term Imo' is negligible, it would be usually avoidable that the cross current Ic causes the power plant to overload if only the steady-state term Iio' of the voltage regulator is adjusted to 1.2 times the internal load current magnitude If' and the gain ratio $(Hv'/H\omega')$ of the speed governor to the voltage regulator is set to 1.2 times the regulative coefficient $\mu\omega$ of Eq. (11a) at the same time. On the other hand, for a power plant equipped with the speed governor whose steady-state term Imo' is larger in capacity as compared to those of the other power plants, it is necessary to satisfy the condition of Eq. (12) or (12a) with respect to the supply current İ whose active and reactive components are produced correspondingly to the steady-state terms Imo' and Iio' of the speed controller and the voltage regulator respectively in order to make the power plant be in the zero-cross-current state, that is, to protect the power plant against overloading. Moreover, in omitting the line effect such as a voltage drop $(\dot{I}t\cdot\dot{Z}t)$ and a current loss $(It^2\cdot\dot{Z}t/Et)$ for a power plant provided with the active and reactive transmission current characteristics of Eq. (21), a cross current Ic would be also generated. According to both of the equations (11) and (20), in setting the voltage drop $(\dot{I}t\cdot\dot{Z}t)$ at naught corresponds to changing the voltage reference Er included in the active-current to voltage deviation function. If the active and reactive supply current characteristics of Eq. (21), therefore, is applied in omitting the voltage drop $(\dot{I}t\cdot\dot{Z}t)$ to a power plant delivering the supply current I over a considerably-long-distance transmission line, then it is extremely probable that the cross current Ic would be generated in great quantities and thereby that the other power plants interconnected would be forced to fall into overloads. On the other hand, omitting the reactive component of line-loss current, $(It^2\cdot Xt/Et)$, from the terms of Eq. (12) corresponds to changing the allotment of reactive loads proportionally to that of active loads between the interconnected power plants. The line resistance Rt is usually so small in value that the active component of line-loss current, $(It^2\cdot Rt/Et)$, may be ignored for general applications of Eq. (21). After all, the omission of the line-loss current $(It^2\cdot\dot{Z}t/Et)$ from the terms of Eq. (21) is intimately associated with the distribution of the reactive loads to individual nodes of the transmission line, but its effect is extremely small as compared with that of the voltage drop $(\dot{I}t\cdot\dot{Z}t)$.

Figure 6:
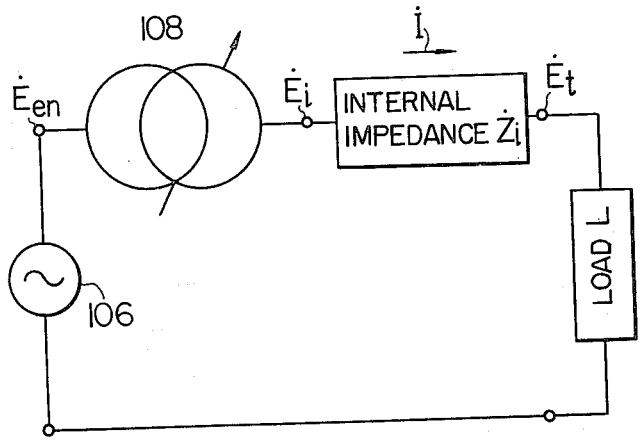
FIG. 6 is an equivalent circuit of a power substation for explaining the principal of the present invention.

In a power substation equipped with an induction regulator or a tap-changed transformer, the input-terminal voltage Ėen is transformed into the internal voltage Ėi by an induction regulator 108 and thereby the supply current İ is directed to the load L through the internal impedance $\dot{Z}i$ existing between the internal voltage Ėi and the output-terminal voltage Ėt, as shown in the equivalent circuit of FIG. 6.

Provided, thereupon, that the internal generation current İi and the internal load current İf of the power substation are defined identically with those of the power plant, the current characteristics of the power substation may be also expressed by Eq. (1). Furthermore, in steady-stage operations it is possible all the time to define the active-current deviation factor $\delta$ at any node to which either power plant or power substation is connected, even though the configuration of transmission networks is generally complicated. Besides, using Eq. (20) the load-center voltage Ėn can be calculated in either power plants or power substations connected to the sending-end node of the transmission line. Therefore, assuming the regulative coefficient $\mu$ included in Eq. (11) as the characteristic constant of a specific load-center node, the active-current to voltage deviation function $\lambda$ for the load-center node can be determined in all of the power plants and power substations without any distinction between them.

After all, it is possible for every power plant or power substation connected to the specific load-center node to maintain the zero-cross-current state by applying the value of $\lambda$ to Eq. (12).

The method and the apparatus according to the present invention which is intended to control a power plant or a power substation by making the reactive supply current Iq dependent on the active supply current Ip through the active-current to voltage deviation function $\lambda$ of Eq. (11) or through the frequency to voltage deviation function $\lambda\omega$ of Eq. (11a), are hereinafter referred to as the "P-dependent Q control" or briefly the "PQ control" method and apparatus respectively. Moreover, the power plant and power substation to which the present invention is applied, are generically named the "P-dependent Q controlled" or "PQ controlled" power station.

Figure 7:
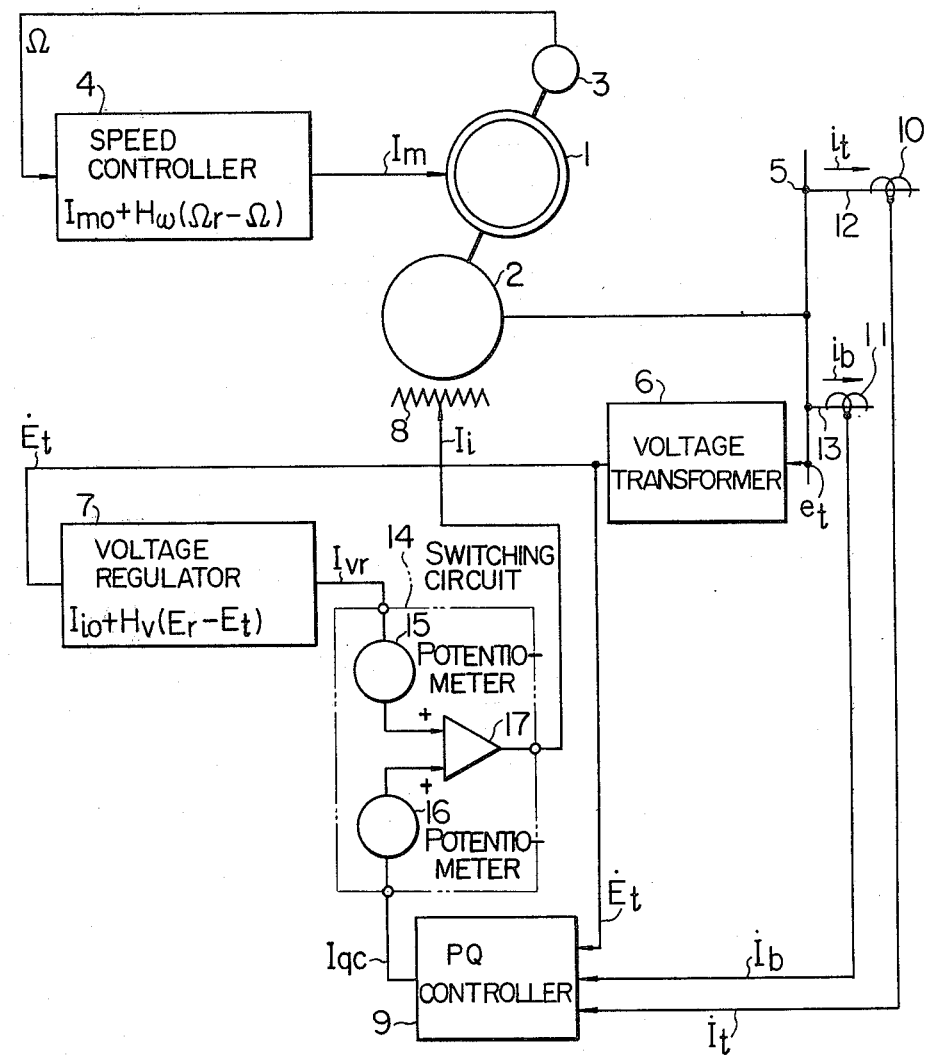
FIG. 7 is a schematic diagram illustrative of an embodiment of the present invention.

FIG. 7 is a schematic diagram illustrative of an embodiment of the present invention which is applied to a power plant. In this figure, reference numeral 1 shows a turbine, 2 a generator, 3 a speed-signal generator, 4 a speed governor, 5 a node, 6 a voltage transformer, 7 a voltage regulator, 8 an excitation circuit of the generator; the configuration of the system composed of the foregoing elements 1–8 is identical with that of a conventional speed-governed and voltage-regulated power plant. Reference numeral 9 shows a PQ controller; the element 9 according to the present invention will be illustrated in detail using the following figure 8, 10 and 11 current transformers, 12 a transmission line, 13 a branch, and 14 a switching circuit. The element 14 is composed of a pair of potentiometers or scaling amplifiers 15 and 16 for which solid-state relays, for instance, made of semiconductors are available, and a summing amplifier 17.

First of all, the case of setting the coefficient A of the potentiometer 15 at unity and the coefficient B of the potentiometer 16 at zero is considered.

In the ordinary operation of the turbine 1, the angular frequency of the generator 2 driven by the turbine 1 is detected by the speed-signal generator 3 mounted on the shaft of the turbine 1 and delivered to the speed controller 4 as a frequency signal $\Omega$. As the result, the driving current Im being produced in accordance with the characteristics of Eq. (3) with which the speed governor 4 is provided, is transmitted to the generator 2 through the turbine 1.

On the other hand, the voltage $e_t$ appearing at the node 5 to which the generator 2 is connected, is stepped down to an appropriate value by the voltage transformer 6 with which the node 5 is equipped, so as to be converted into the terminal-voltage signal $\dot{E}t$, which is transmitted to the voltage regulator 7. As the result, the control signal Iav being produced in accordance with the characteristics of Eq. (4) with which the voltage regulator 7 is provided, is transmitted to the excitation circuit 8 through the potentiometer 15 and the summing amplifier 17 to regulate the internal generation current magnitude Ii of the generator 2. In short, the above-mentioned behavior is identical with that of the conventional speed-governed and voltage-regulated power plant.

It follows to consider the case of setting the coefficient A of the potentiometer 15 at zero and the coefficient B of the potentiometer 16 at unity, that is, the configuration of a PQ-controlled power plant.

In this case, the PQ controller 9 is supplied with the terminal-voltage signal $\dot{E}t$ detected by means of the voltage transformer 6. The transmission-current signal It detected by means of the current transformer 10 with which a transmission line 12 is equipped, and the branch-current signal $\dot{I}b$ detected by the current transformer 11 with which the branch 13 is equipped, respectively. Thereupon, the control signal Iqc is produced in accordance with the conditions of Eqs. (11) and (12) as described later, and transmitted to the excitation circuit 8 through the potentiometer 16 and the summing amplifier 17 to regulate the internal generation current magnitude Ii of the generator 2.

Figure 8:
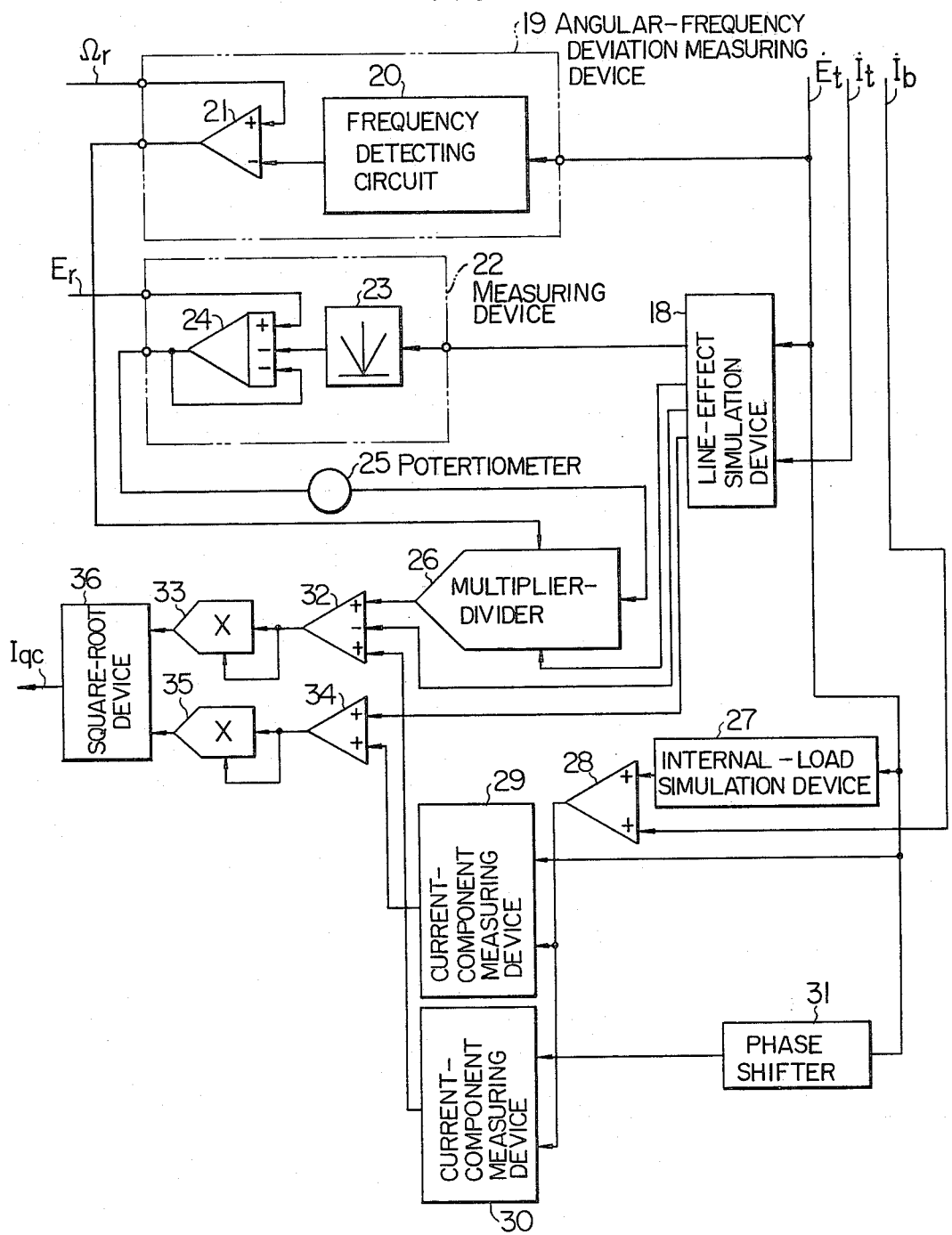
FIG. 8 is a block diagram of an example of the PQ controller in FIG. 7.

FIG. 8 is a block diagram of an example of the RQ controller 9 in the FIG. 7. Here in FIG. 8 the frequency to voltage deviation function $\lambda\omega$ of Eq. (11a) is employed.

Figure 9:
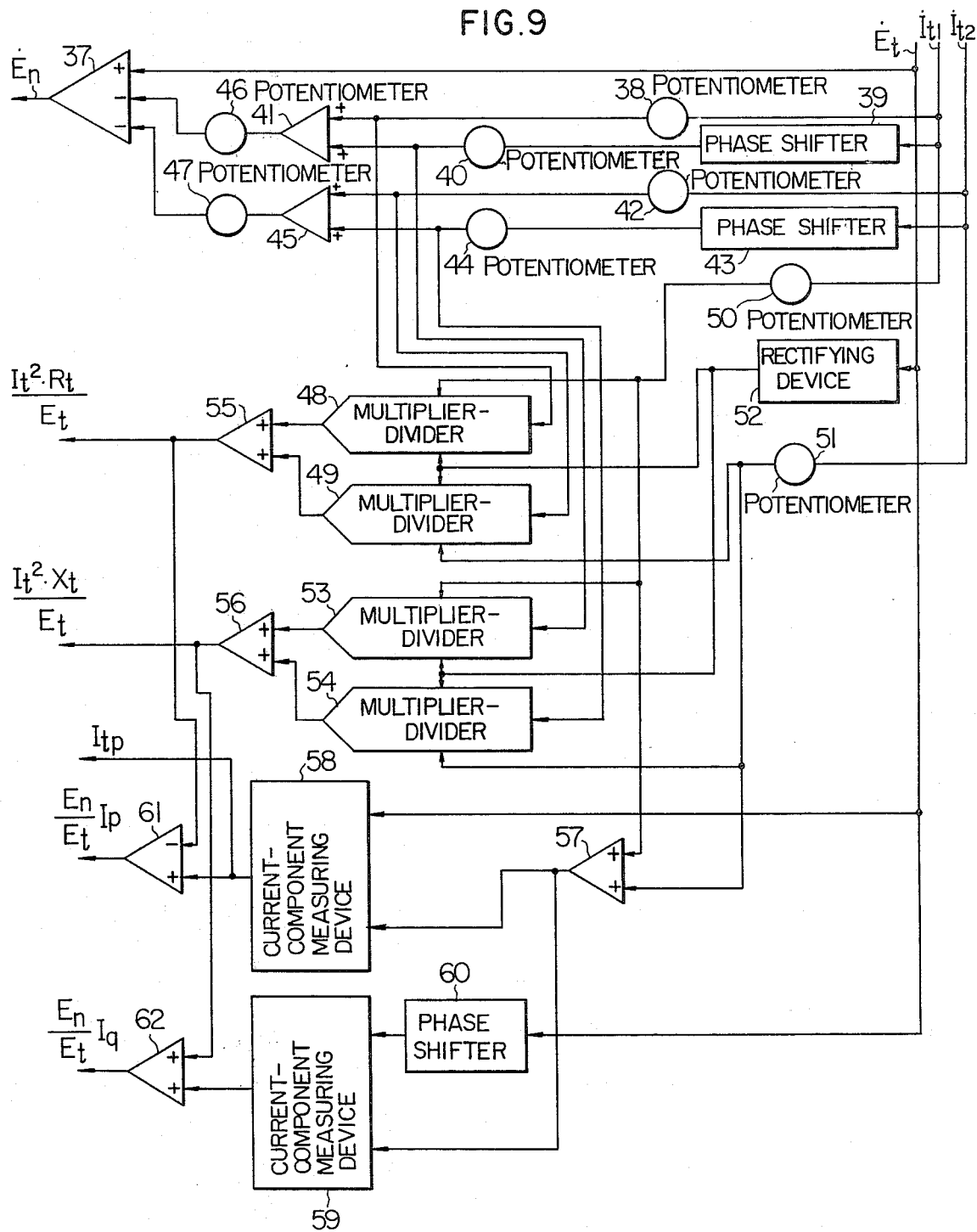
FIG. 9 is a block diagram of an example of a line-effect simulation device in FIG. 8.

As seen from FIG. 7, both of the terminal-voltage signal $\dot{E}t$ detected by the voltage transformer 6 and the transmission-current signal It detected by the current transformer 12 are supplied for a line-effect simulation device 18, which will be illustrated in detail using the following FIG. 9. Hereby, the load-center voltage signal $\dot{E}n$, the reactive line-loss current signal $(It^2 \cdot Xt/Et)$, and (En/Et) times the active supply current signal Ip are derived respectively.

In an angular frequency-deviation measuring device 19, it follows that the terminal-voltage $\dot{E}t$ is applied to a frequency detecting circuit 20 for detecting the frequency signal $\Omega$, which is subtracted from the frequency-reference signal $\Omega r$ by a summing amplifier 21 to produce a frequency-deviation signal $(\Omega r - \Omega)$.

In a voltage-deviation measuring device 22, the load-center voltage signal $\dot{E}n$ is transmitted from the line-effect simulation device 18 to a rectifying device 23 and thereby converted into a dc signal, that is, the load-center voltage magnitude signal En, which is smoothed and subtracted from the voltage-reference signal Er by a lagging network 24 to produce a voltage-deviation signal (Er−En).

Then, a multiplier-divider 26 is supplied with the signal $(\Omega r - \Omega)$ directly from the measuring device 19 while with the signal (Er−En) from the measuring device 22 through a potentiometer 25 provided with a coefficient $(-\mu\omega)$, and further with a signal $\{(En/Et)Ip\}$ from the simulation device 18 so that a signal representing (En/Et) Idq may be produced in accordance with the formula $$\{(-\mu\omega)(Er-Et)/(\Omega r - \Omega)\} Ip = Idq.$$

Figure 14:
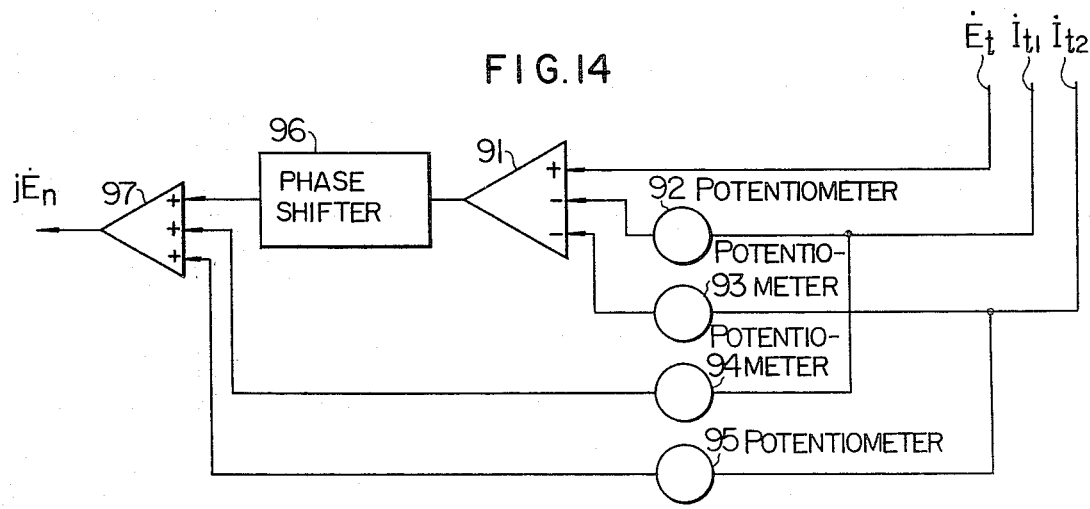
FIG. 14 is a block diagram of another example of a line-effect simulation device.

On the other hand, the terminal-voltage signal $\dot{E}t$ is inverted into the internal-load current signal $\dot{I}f$ by an internal-load simulation device 27 whose example will be illustrated using the following FIG. 14. The branch-current signal $\dot{I}b$ detected by the current transformer 11 with which the branch 13 is equipped, and the internal-load current signal $\dot{I}f$ are summed up by a summing amplifier 28 to produce a resultant-current signal ($\dot{I}f + \dot{I}b$), which is transmitted to both of current-component measuring devices 29 and 30. The terminal-voltage signal Et is applied directly to the current-component measuring device 29 to produce an active resultant-current signal (Ifp+Ibp), while to the current-component measuring device 30 through a $(\pi/2)$ phase shifter 31 to produce a reactive resultant-current signal (Ifq+Ibq).

The output signal of the multiplier-divider 26 representing $\{(En/Et)Idq\}$, one of the output signals of the line-effect simulation device 18 representing $(It^2 \cdot Xt/Et)$, and the output signal of the current-component measuring device 30 are summed up by a summing amplifier 32, whose output signal is squared by a multiplier 33. Similarly, the active transmission-current signal Itp transmitted from the line-effect simulation device 18, and the output signal of the current-component measuring device 29 representing (Ifp+Ibp) are summed up by a summing amplifier 34, whose output signal is squared by a multiplier 35.

Referring to the output signal of the summing amplifier 32, it should be seen from the foregoing definition that the algebraic sum of the quantity $\{(En/Et)Idq\}$ and the quantity $(It^2 \cdot Xt/Et)$ is identical with the zero-cross reactive transmission current Idtq. Accordingly, when the output signals of the multipliers 33 and 35 are applied to a square-root device 36 for calculating a square-root value of sum of the outputs of the multipliers and thereby the square-root of the quantity $\{(Ifq+Ibq+Idtq)^2+(Ifp+Ibp+Ip)^2\}$ is obtained, then the internal-generation current magnitude signal Ii requisite for the power plant to fulfil the zero-cross-current condition with respect to the load-center node is delivered as the output signal of the apparatus according to the present invention, that is, PQ controller 9.

Further, in the case of using the active transmission-current signal Itp being a dc signal, the terminal-voltage magnitude signal Et being a dc signal, and the terminal-voltage signal $\dot{E}t$ being an ac signal, the ac signal corresponding to the active transmission current, (Itp=Itp sin $\Omega t$), can be obtained by a computing device for multiplication and division of the signals, ($\dot{E}t \cdot Itp/Et$). Similarly, in the case of using the zero-cross reactive transmission-current signal Idtq and the terminal-voltage magnitude signal Et being both dc signals, and the terminal-voltage signal $\dot{E}t$ being an ac signal, the ac signal corresponding to the zero-cross reactive transmission current representing {Idtq=Idtq sin ($\Omega t - \pi/2$)} can also be obtained by means of a computing device for multiplication and division of the signals ($\dot{E}t \cdot Idtq/Et$) and a ($\pi/2$) phase shifter inserted in the output circuit of the computing device. The algebraic sum of the ac current signals $\dot{I}tp$ and $\dot{I}dtq$ is the zero-cross transmission current signal $\dot{I}dt$. In this scheme, thus, it is possible to produce the signal $|\dot{I}f + \dot{I}b + \dot{I}dt|$, that is, the PQ-control signal Iqc by rectifying and smoothing the algebraic sum of the internal-load current signal $\dot{I}f$, the branch-current signal $\dot{I}b$ and the zero-cross transmission current signal $\dot{I}dt$.

Furthermore, when the terminal-voltage signal $\dot{E}t$ being an ac signal is applied to one of the input terminals of a multiplier and the error signal between the output signal of the multiplier and the active transmission-current signal Itp being a dc signal is fed back to another input terminals of the multiplier through a high-gain amplifier so as to form a negative feedback loop, the ac signal corresponding to the active transmission current, $\dot{I}tp$, can be obtained. Moreover, the ac signal corresponding to the zero-cross reactive transmission current, $\dot{I}dtq$, can also be obtained by disposing a ($\pi/2$) phase shifter on the output side of a multiplier having the configuration similar to that of the computing circuit for the signal $\dot{I}tp$.

It is absolutely necessary for the establishment of the zero-cross-current state in a power station to fulfil the condition of Eq. (12) with respect to all of the currents flowing out of the power station. Therefore, when the PQ controller 9 is applied to a power station to whose terminal-node other power stations are connected, the branch-current signal $\dot{I}b$ must be divided among the power stations in proportion to the active-load ratio of individual power station. According to the above-mentioned requirement, in the embodiment of FIG. 8, a computing device is inserted between the terminal of the current transformer 13 and the input terminal of the summing amplifier 28 so as to multiply the branch-current signal $\dot{I}b$ by {Ip/(Ip+Ip')}.

Furthermore, among the power stations interconnected with each other through branches or tie-lines on each of which a portion of the output current (or current difference between the internal generation current $\dot{I}i$ and the internal load current $\dot{I}f$) flows, the active-current to voltage deviation function $\lambda$ (or frequency to voltage deviation function $\lambda\omega$) which is common to the branches or tie-lines concerned with the interconnection, is applied to the branch currents or tie-line loads so that the zero-cross-current state might be established with respect to the branches or tie-lines. In every power station, however, the power factor of transmission current $\dot{I}t$ is not always identical with that of the branch current Ib and likewise the same function $\lambda$ (or $\lambda\omega$) is not necessarily applied to all of the branch currents or tie-line loads flowing out of the power station.

FIG. 9 is a block diagram of an example of the line-effect simulation device 18 shown in FIG. 8, showing the configuration suitable for a PQ-controlled power station delivering the respective supply currents $\dot{I}t1$ and $\dot{I}t2$ from the sending-end node to the different load-center nodes over the first and second transmission lines, where the symbols relative to the first and second transmission lines are denoted by the subscripts 1 and 2 respectively.

The transmission-current signal of the first line, $\dot{I}t1$, is converted respectively into a signal ($\dot{I}t1 \cdot Rt1$) by a potentiometer 38 having an arbitrary constant Rt1 and into a signal (j·$\dot{I}t1 \cdot Xt1$) by a ($\pi/2$) phase shifter 39 and a potentiometer 40 having an arbitrary constant Xt1. Both of the signals ($\dot{I}t1 \cdot Rt1$) and (j·$\dot{I}t1 \cdot Xt1$) are applied to a summing amplifier 41 to be converted into a voltage-drop signal ($\dot{I}t1 \cdot \dot{Z}t1$). Likewise, the transmission-current signal of the second line, $\dot{I}t2$, is converted respectively into a signal ($\dot{I}t2 \cdot Rt2$) by a potentiometer 42 and into a signal (j·$\dot{I}t2 \cdot Xt2$) by a ($\pi/2$) phase shifter 43 and a potentiometer 44. Both of the signals ($\dot{I}t2 \cdot Rt2$) and (j·$\dot{I}t2 \cdot Xt2$) are transmitted to a summing amplifier 45 to produce a voltage-drop signal ($\dot{I}t2 \cdot \dot{Z}t2$).

The output signals of the summing amplifiers 41 and 45, ($\dot{I}t1 \cdot \dot{Z}t1$) and ($\dot{I}t2 \cdot \dot{Z}t2$), are multiplied respectively by arbitrary constants Kv1 and Kv2 by potentiometers 46 and 47, both of whose output signals are subtracted from the terminal-voltage signal $\dot{E}t$ by a summing amplifier 37 so that a load-center voltage signal $\dot{E}n$ of Eq. (37) may be delivered out of the line-effect simulation device 18;

$$\dot{E}n = \dot{E}t - (Kv1 \cdot \dot{I}t1 \cdot \dot{Z}t1 + Kv2 \cdot \dot{I}t2 \cdot \dot{Z}t2) \qquad (37)$$

Two multiplier-dividers 48 and 49 are respectively supplied with the signals ($\dot{I}t1 \cdot Rt1$) and ($\dot{I}t2 \cdot Rt2$) from the potentiometers 38 and 42 and with the transmission-current signals $\dot{I}t1$ and $\dot{I}t2$ increased by arbitrary constants Kt1 and Kt2 times from potentiometers 50 and 51 so as to be multiplied by each other, and further, with the terminal-voltage magnitude signal Et, into which the signal $\dot{E}t$ from the potential transformer 6 is converted by a rectifying (smoothing) device 52, so that divisions may be exercised. Likewise, multiplier-dividers 53 and 54 are respectively supplied with the signals (j·$\dot{I}t1 \cdot Xt1$) and (j·$\dot{I}t2 \cdot Xt2$) from the potentiometers 40 and 44 and the signals (Kt1·It1) and (Kt2·$\dot{I}t2$) from the potentiometers 50 and 51 so as to be multiplied by each other, and further, with the signal Et from the rectifying device 52 so that divisions may be done.

When the output signals of the multiplier-dividers 48 and 49 are summed up by a summing amplifier 55 and those of the multiplier-dividers 53 and 54 are summed up by a summing amplifier 56, then an active line-loss current signal (It²·Rt/Et) of Eq. (38) and a reactive line-loss current signal (It²·Xt/Et) of Eq. (39) are respectively delivered out of the line-effect simulation device 18;

$$\frac{It^2 \cdot Rt}{Et} = Kt1 \frac{It1^2 \cdot Rt1}{Et} + Kt2 \frac{It2^2 \cdot Rt2}{Et} \qquad (38)$$

$$\frac{It^2 \cdot Xt}{Et} = Kt1 \frac{It1^2 \cdot Xt1}{Et} + Kt2 \frac{It2^2 \cdot Xt2}{Et} \qquad (39)$$

On the other hand, the signals (Kt1·$\dot{I}t1$) and (Kt2·$\dot{I}t2$) are summed up by a summing amplifier 57 whose output signal is transmitted to both current-component measuring devices 58 and 59. The terminal-voltage signal $\dot{E}t$ is applied directly to the measuring device 58 to produce an active transmission-current signal Itp of Eq. (40)

while to the measuring device 59 through a $(\pi/2)$ phase shifter 60 to produce a reactive transmission-current signal Itq of Eq. (41). Furthermore, subtracting the output signal of the summing amplifier 55 from that of the measuring device 58 by a summing amplifier 61, a signal of Eq. (42) is obtained, while adding the output signal of the summing amplifier 56 to that of the measuring device 59 by a summing amplifier 62, a signal of Eq. (43) is yielded. As the result, the signals relative to the active and reactive supply currents Ip and Iq are respectively delivered out of line-effect simulation device 18;

$$Itp = Kt1 \; Itp1 + Kt2 \; Itp2 + Ipo \qquad (40)$$

$$Itq = Kt1 \; Itq1 + Kt2 \; Itq2 + Iqo \qquad (41)$$

$$\frac{En}{Et} Ip = Kt1 \left( Itp1 - \frac{It1^2 \cdot Rt1}{Et} \right) + Kt2 \left( Itp2 - \frac{It2^2 \cdot Rt2}{Et} \right) \qquad (42)$$

$$\frac{En}{Et} Iq = Kt1 \left( Itq1 + \frac{It1^2 \cdot Xt1}{Et} \right) + Kt2 \left( Itq2 + \frac{It2^2 \cdot Xt2}{Et} \right) \qquad (43)$$

where Ipo and Iqo are the signals representative of the steady-state terms of active and reactive supply-current characteristics, with which the measuring devices 58 and 59 are respectively provided.

According to Eq. (37), the load-center voltage signal $\dot{E}n$ depends on a weighted average of the voltage-drop signals $(\dot{I}t1 \cdot \dot{Z}t1)$ and $(\dot{I}t2 \cdot \dot{Z}t2)$ developed respectively across the first and second transmission lines in taking Kv1 and Kv2 as weighting constants. In a special case of Kv1=1 and Kv2=0, the receiving-end voltage of the first transmission line would be used for the load-center voltage signal $\dot{E}n$. Similarly, according to Eqs. (38)–(43), each of the line-loss current signal $(It^2 \cdot \dot{Z}t/Et)$, the transmission-current signal It and the supply-current signal I depends all on a weighted average of transmission-currents $\dot{I}t1$ and $\dot{I}t2$ flowing respectively into the first and second transmission lines in taking Kt1 and Kt2 as weighting constants. In a special case of Kt1=1 and Kt2=0, the transmission current It1 flowing into the first transmission line would be employed for the transmission-current signal It.

In case there are a number of load centers having the daily-load curves different from each other such as those of industrial and residential loads, it is possible to carry out the PQ control with respect to the heaviest-load center only by determining the constants Kv and Kt appropriate to one of the load centers distributed in parallel through individual transmission lines or the line impedance $\dot{Z}t$ suitable for one of the load centers distributed in sequence on a transmission line.

Assuming the line impedance $\dot{Z}t$ to be zero, the PQ control with respect to a load center existing at the sending-end node of a transmission line, that is, at the output terminal of a power station would be carried out. Furthermore, if the active and reactive branch-current signals Ibp and Ibq are supplied for the measuring devices 58 and 59 respectively instead of the steady-state term signals Ipo and Iqo provided for the active and reactive supply-current characteristics, the PQ control could be carried out taking the branch current $\dot{I}b$ as the load current of the sending-end node. Besides, the transmission-current signal $\dot{I}t$ with respect to the line impedance $\dot{Z}t$ assumed to be zero would be suitable for the application of the controller 9 to a high-speed excited power station required to respond to steeply-changing loads such as roller-mills, electric furnaces and so on. On the other hand, a pair of the steady-state term signals Ipo and Iqo might be useful for the application of the PQ controller 9 to a program-operated power station required to vary the output current $(\dot{I}i - \dot{I}f)$ or $(\dot{I}b + \dot{I}t)$ in compliance with the daily-load curve.

Figure 10:
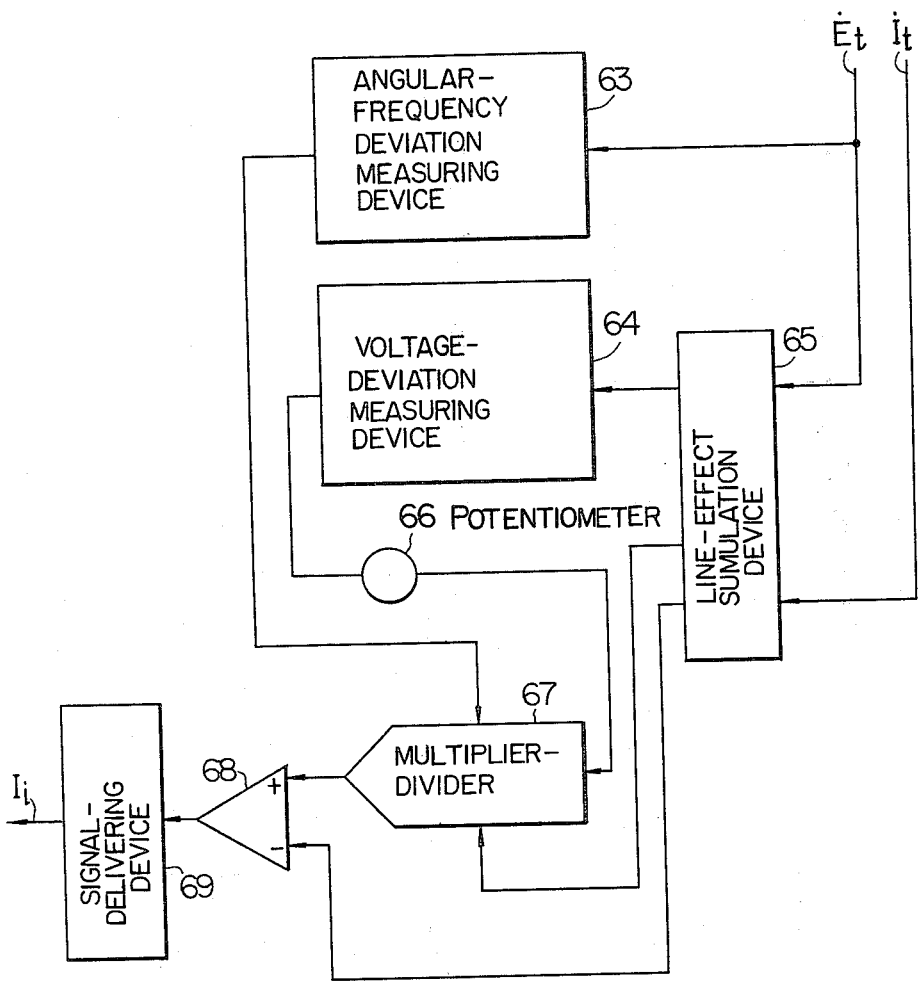
FIG. 10 is a block diagram of another example of the PQ controller.

FIG. 10 is a block diagram of another example of PQ controller 9. In the figure, reference numeral 63 shows an angular-frequency deviation measuring device identical with the element 19 of FIG. 8 in structure, 64 a voltage-deviation measuring device identical with the element 22, and 65 a line-effect simulation device identical with the element 18.

At first, the terminal-voltage signal $\dot{E}t$ is applied to the angular-frequency deviation measuring device 63, from which an angular-frequency deviation signal $(\Omega r - \Omega)$ is delivered. On the other hand, the load-center voltage signal $\dot{E}n$ is transmitted from the line-effect simulation device 65 to the voltage-deviation measuring device 64, from which the voltage-deviation signal $(Er - En)$ is put out.

Similarly to the element 26 of FIG. 8, a multiplier-divider 67 is supplied with the frequency-deviation signal $(\Omega r = \Omega)$ directly from the measuring device 63 while with the voltage-deviation $(Er - En)$ from the measuring device 64 through a potentiometer 66 provided with a coefficient $(-\mu\omega)$, and further, with the signal $\{(En/Et) \; Ip\}$ from the simulation device 65 so that a signal $\{(En/Et) \; Idq\}$ may be computed. Furthermore, the output signal of the multiplier-divider 67, $\{(En/Et) \; Idq\}$, and one of the output signals of the line-effect simulation device 65, $\{(En/Et) \; Iq\}$, are applied to a summing amplifier 68 so as to detect the difference between the two signals, that is, an error signal $\{(En/Et) \; (Idq - Iq)\}$.

Finally, the output signal of the summing amplifier 68 is amplified by a signal-delivering device 69, from which the PQ-control signal Iqc feasible for the negative-feedback control based on Eq. (23) is put out.

Denoting the transfer function of the signal-delivering device 69 by Hc, the transfer function H of Eq. (23) will be equivalent to $\{Hc \; (En/Et)\}$.

In general, the PQ-controlled power station according to the configuration of FIG. 7 is liable to generate the cross current composed of a steady-state term $(A \cdot Iio)$ and a variable term $\{A \cdot Hv \; (Et - En)\}$ when both of the coefficients A and B of the switching circuit 14 are preset to nonzero, that is, $A \neq 0$ and $B \neq 0$. However, if an integrator is used for the signal-delivering device 69, it would be improbable regardless of the value of the coefficient A that the cross current Ic due to the control signal Iav produced by the voltage regulator 7 remains as a steady-state error in the PQ-controlled power station.

In addition, applying an unity signal to each of the multiplier-dividers 48, 49, 53 and 54 instead of the terminal-voltage magnitude signal Et and at the same time replacing a pair of the current-component measuring devices 58 and 59 by power-measuring devices, active and reactive power signals $(En \cdot Ip)$ and $(En \cdot Iq)$ can be delivered from the summing amplifiers 61 and 62, respectively. In the embodiment using the signals (En·Ip) and (En·Iq) as substitute for the signals {(En/Et) Ip} and {(En/Et) Iq} of FIG. 10, it would be still possible to deliver the PQ-control signal Iqc identical with the control signal Ii of Eq. (23) from the signal-delivering device 69, if only the relationship between the transfer functions is determined as H=Hc/Et.

Figure 11:
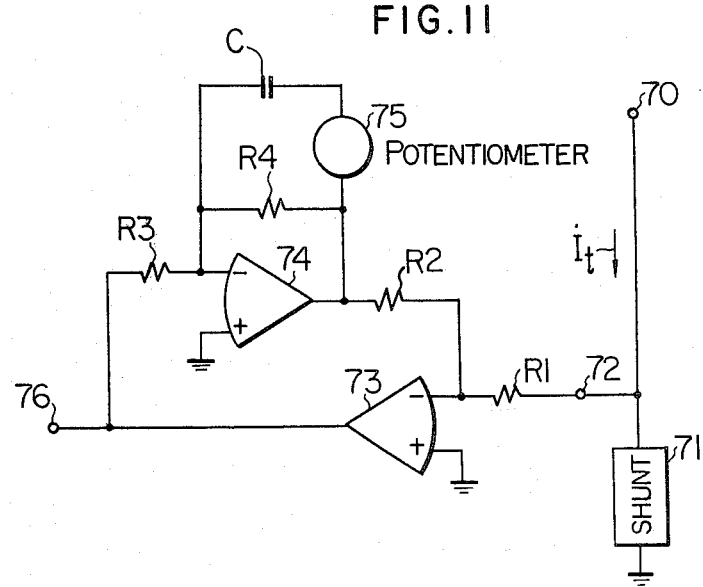
FIG. 11 is a block diagram of a main part of another example of the line-effect simulation device.

FIG. 11 is a block diagram of a main part included in another example of the line-effect simulation device 18 appearing in FIG. 8.

In operation, first of all, an ac voltage Vin proportionate to a transmission current $i_t$ is transmitted to a terminal 72 from a terminal of a shunt 71 into which the transmission-current signal İt is flowing from a terminal 70. The voltage Vin at the terminal 72 and the output voltage of an operational amplifier 74 are applied to an operational amplifier 73 through resistors R1 and R2 respectively, and further, the output voltage of the operational amplifier 73 is fed back to the operational amplifier 74 through a resistor R3. Furthermore, the output voltage of the operational amplifier 74 is fed back to itself through a parallel circuit composed of a resistor R4 and a series circuit of a potentiometer 75 and a capacitor C.

Assuming that a set of current equations established at individual input-terminals of the operational amplifiers 73 and 74 be satisfied simultaneously, the following equation (44) can be obtained for the transfer function of a path from the terminal 72 with the ac voltage Vin to the terminal 76 with the ac voltage Vout;

$$\frac{Vout}{Vin} = \frac{R2 \cdot R3}{R1 \cdot R4} + K \cdot C \frac{R2 \cdot R3}{R1} s \quad (44)$$

where
s: Laplace operator
K: arbitrary constant
R1-R4: resistance of resistors R1-R4
C: capacitance of capacitor C On the other hand, the line voltage drop e is developed in accordance with the following equation (45) in a series circuit of a line resistance Rt and a line inductance Lt in which the transmission current $i_t$ is flowing;

$$e = Rt \cdot i_t + \frac{Xt}{\Omega o} \frac{di_t}{dt} \quad (45)$$

where
e: instantenous value of line drop
$i_t$: instantenuous value of transmission current
$\Omega o$: normal system-frequency
t: time As seen from the comparison of Eqs. (44) and (45), the output voltage of the operational amplifier 73, that is, the voltage of a terminal 76, Vout, should be perfectly identical with a line-drop signal (İT·Żt), provided that the conditions of the following equations (46) and (47) are exactly satisfied:

$$Rt = \frac{R2 \cdot R3}{R1 \cdot R4} \quad (46)$$

$$\frac{Xt}{\Omega o} = K \cdot C \frac{R2 \cdot R3}{R1} \quad (47)$$

Referring to the line impedance Żt, in general the reactance Xt is positive in sign because of including the impedances of power transformers, but variable in magnitude according as the network configurations and the load distributions. Particularly, in series-capacitor compensated lines and cable networks, the line reactance Xt might be provided with a value ranging between the positive and the negative. In such cases, the potentiometer 75 should be capable of providing both of the positive and the negative values for the constant K so as to fulfil the condition of Eq. (47).

Moreover, the product of the signal e of Eq. (45) and the signal (Kt·$i_t$) would be useful for measuring the line-loss power signals corresponding to the line-loss current signals of Eqs. (38) and (39), because the product signal can be converted into Kt times the active and reactive line-loss power signals (It²·Rt) and (It²·Xt) by means of active and reactive power-measuring devices respectively.

Figure 12:
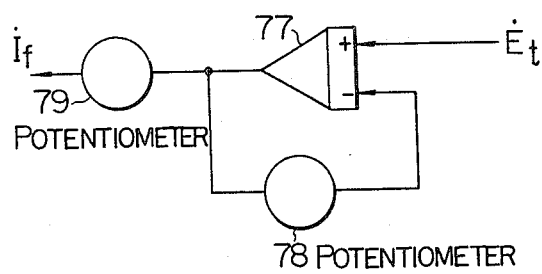
FIG. 12 is a block diagram of an example of an internal-load simulation device in FIG. 8.

FIG. 12 is a block diagram of an example of the internal-load simulation device 27 appearing in the foregoing figure 8.

At first, the terminal-voltage signal Ėt is applied to an integrator 77 whose output signal is fed back to itself through a potentiometer 78 provided with a coefficient (Ri·$\Omega$o/Xi). Then, applying the output signal of the intergrator 77 to a potentiometer 79 provided with a coefficient ($\Omega$o/Xi), an internal-load current signal İf is put out of the simulation device 27.

Figure 13:
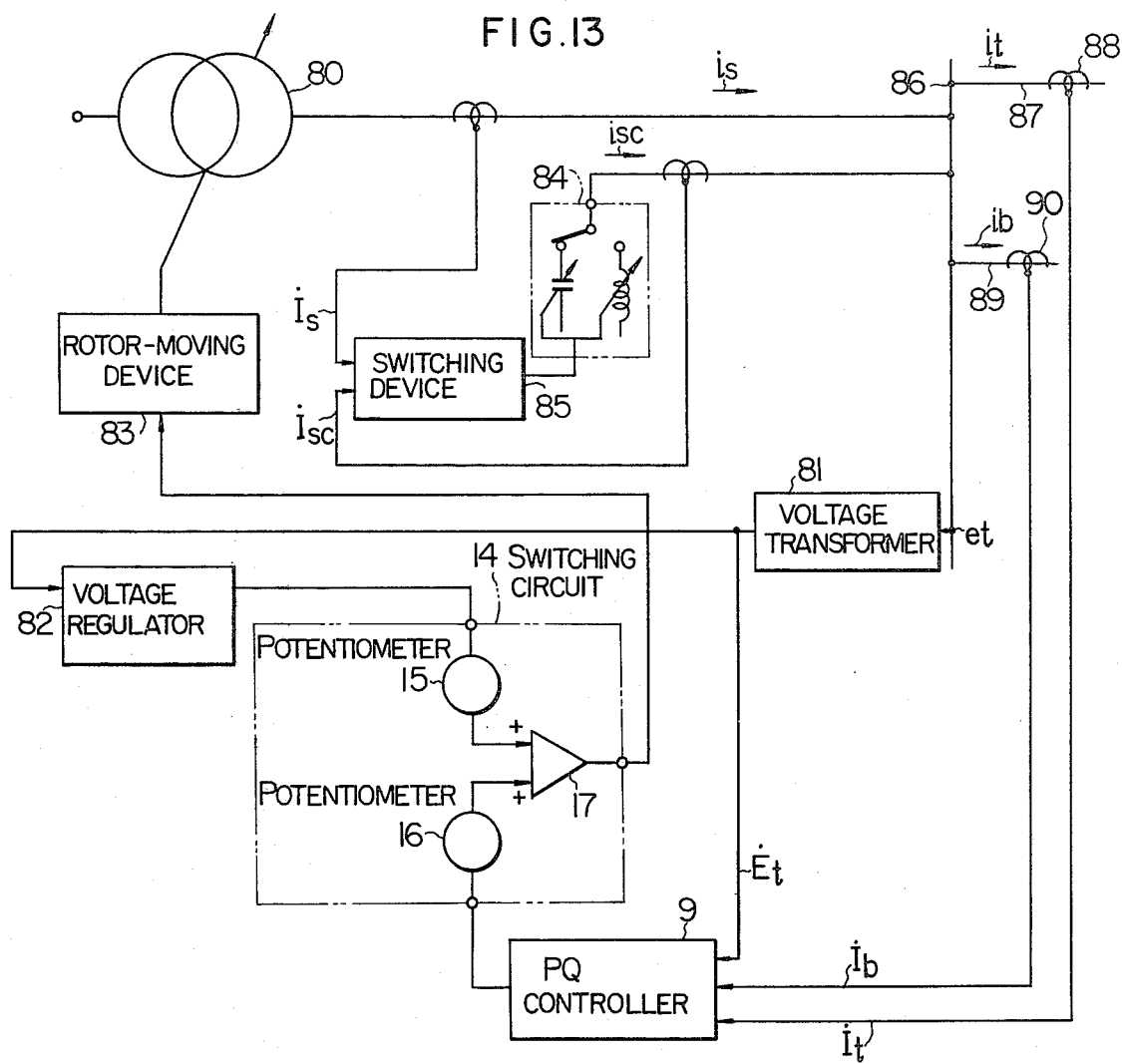
FIG. 13 is a schematic diagram illustrative of another embodiment of the present invention.

FIG. 13 is a schematic diagram illustrative of another embodiment of the present invention applied to a power substation. In the figure, reference numeral 80 shows an induction regulator, 81 a voltage transformer, 82 a voltage regulator, 83 a rotor-moving device, 84 a reactive-current compensating equipment, 85 a switching device: the configuration of the system composed of the foregoing elements 80–85 is identical with that of a conventional power substation. Reference numeral 9 shows a PQ controller and 14 a switching circuit: both of the elements 9 and 14 are similar to those appearing in the foregoing figure 7.

First, in setting each coefficient of potentiometers 15 and 16 in the switching circuit 14 so that A=1 and B=0 respectively, the voltage $e_t$ appearing at a node 86, to which the induction regulator 80 is connected, is stepped down by the voltage transformer 81 with which the node 86 is equipped so as to be converted into terminal-voltage signal Ėt, which is transmitted to the voltage regulator 82. In consequence, the control signal Iav produced in accordance with the characteristics of Eq. (4) is transmitted from the voltage regulator 82 to the rotor-moving device 83 through the potentiometer 15 and a summing amplifier 17 of the switching circuit 14. This configuration is that of a conventional voltage-regulated power substation.

Next, in setting each coefficient of the potentiometers 15 and 16 in the swtcing circuit 14 so that A=0 and B=1, the PQ controller 9 is supplied with the terminal-voltage signal Ėt detected by the voltage transformer 81, the transmission-current signal İt detected by a current transformer 88 with which a transmission line 87 is equipped, and the branch-current signal İb detected by a current transformer 90 with which a branch 89 is equipped. The control signal Iqc, thereupon, required to satisfy the conditions of Eqs. (11) and (12) or (11a) and (12a) is transmitted from the PQ controller 9 to the rotor-moving device 84 through the potentiometer 16 and the summing amplifier 17 of the switching circuit 14 to regulate the internal voltage magnitude Ei or the internal generation current magnitude Ii of the induction regulator 80 and thereby the power substation is made to carry out the PQ control.

In either case when the power substation is in conventional voltage-regulated mode or in PQ-controlled mode, a reactive compensation current $i_{sc}$ with which the power substation is supplied from the reactive-current compensating equipment 84, is so adjusted that the difference between the reactive output current of the induction regulator 80, Isq, and the compensation current Isc does not exceed the prescribed limits. In practice, the induction regulator 80 which is aimed at continuously regulating the output current could be made to reduce the load by the reactive-current compensating equipment 84 composed of shunt-capacitors and reactors in general, whose operation is governed by means of a time-delay circuit of the switching device 85, and thereby the power substation could be improved in its operating characteristics.

The present invention is also applicable to a power substation composed of an induction regulator and a tap-changed under-load transformer equipped with a tap-changing device which is made to respond in accordance with a first-order function of the reactive output current of the induction regulator and that of a tap-changed under-load transformer, that is, which is similar to the switching device 85 in operation.

It is permissible, moreover, to consider the power substation using a synchronous capacitor as the power plant of the foregoing FIG. 7 from which the turbine 1, the speed-signal generator 3 and the speed controller 4 are removed. In this case, substituting the active transmission-current signal of the other interconnected power station for the signal of the power substation using a synchronous capacitor, the PQ controller 9 manufacturred for power plants is available for power substations using synchronous capacitors without any distinction.

It is allowable, furthermore, for the devices and their components used in FIGS. 7–13 to carry out the substantially-equivalent conversion. The part of the line-effect simulation device 18 appearing in the foregoing FIG. 9, for instance, composed of the summing amplifiers 37, 41, 45, the potentiometers 38, 40, 42, 44, 46, 47, and the ($\pi/2$) phase shifters 39, 43, is equivalent to the simulation device of the following FIG. 14, composed of summing amplifiers 91, 97, potentiometers 92–95, and a ($\pi/2$) phase shifter 96 in obtaining the load-center voltage magnitude signal En from the rectifying device 23 in the foregoing FIG. 8.

Referring to FIG. 14, the potentiometer 92 is preliminarily provided with a coefficient (Kv1·Rt1), 93 with (Kv2·Rt2), 94 with (Kv1·Xt1) and 95 with (Kv2·Xt2). The terminal-voltage signal Ėt is applied to the plus-input terminal of the summing amplifier 91. The first transmission-current signal İt1 is delivered to both of the potentiometers 92 and 94, while the second transmission-current signal İt2 to both of the potentiometers 93 and 95. Then, each of the output signals of the potentiometers 92 and 93 is transmitted to each of the minus-input terminals of the summing amplifier 91, whose output signal is further transmitted to the summing amplifier 97 through the ($\pi/2$) phase shifter 96. On the other hand, both of the output signals of the potentiometers 94 and 95 are transmitted directly to the summing amplifier 97. As the result, the signal (j·Ėn) is delivered from the summing amplifier 97 to the voltage-deviation measuring device 22 (FIG. 8), in which the signal (j·Ėn) is rectified by the rectifying device 23 to be converted into the load-center voltage magnitude signal En.

In case of the signal-delivering device 69 (FIG. 10) having the transfer function Hc of integrating characteristics, it is possible to carry out the present invention by applying the output signal Iav of the voltage regulator 7 directly to the excitation circuit 8 of the generator 2 in the scheme of FIG. 7 or the output signal Iav of the voltage regulator 82 directly to the rotor-moving device 83 of the induction regulator 80 in the scheme of FIG. 13 and at the same time by adding the output signal Iqc of the PQ controller 9 to the voltage-reference signal Er or the steady-state term signal Iio of the voltage regulator 7 (FIG. 7) or 83 (FIG. 13) after removing the switching circuit 14 from the scheme of FIG. 7 or 13.

Furthermore, disposing an analog to digital converter on the input side and at the same time a digital to analog converter on the output side of a device or deives used in the PQ controller 9, it is permissible to replace the device or the whole of the PQ controller 9 by a digital computer.

Besides, it should be noted that any devices made up of the articles on the free market or manufactured according to the prior art are available for the frequency-detecting device 20, the multiplier-dividers 26, 48, 49, 53, 54, 67, the current-component measuring devices 29, 30, 58, 59, the (90/2) phase shifters 31, 39, 43, 60, 96, etc. Moreover, the potentiometers appearing in FIGS. 7–14, that is, 15, 16, 25, 38, 40, 42, 46, 47, 50, 51, 66, 75, 78, 79, 92 and 95 are ordinarily provided with built-in buffer amplifiers. On the other hand, a multiplier could be used for a potentiometer in applying the variable signal to an input terminal and the constant signal to another input terminal of the multiplier.

As previously stated, it is extremely probable for existing electric power systems that an enormous quantity of cross current is undesirably forced to interflow between the conventional voltage-regulated power stations connected to individual terminal-ends of a transmission line due to the mismatch of the control actions or the characteristic constants between voltage regulators, even though the line impedance, Żt is very small and therefore the voltage difference between the node voltages Ėn and Ėn' appearing at respective terminal-ends of the transmission line is imperceptible. Moreover, undesirable cross current occurring due to improper actions of a voltage regulator is the greater in quantity, the larger the power station equipped with the voltage regulator is in capacity.

The present invention is very effective in rationalizing the distribution of currents flowing in a network, because the so-called base-load large-capacity power plant governed by the method or apparatus according to the present invention, is so sensitive to reactive-load changes as to make the supply current İ vary in accordance with Eqs. (11) and (12) or (11a) and (12a) while insensitive to active-load variations all the time.

An important feature of the PQ controller according to the present invention is to fulfill the role of a cross-current regulator because of its ability to regulate the cross current Ic in interconnected power stations, each of which is governed by the PQ controller according to the present invention.

It would be possible to eliminate the risk of overloading due to cross current from every power station existing in a power system, provided that all of the large-capacity power stations such as nuclear power plants are governed by the method of apparatus according to the present invention. On the other hand, the present invention should be adequate to attain the purpose of stabilizing the operations of small-capacity power plants subject to the influence of cross current if only applied to each of the small-capacity power plants existing in a power system.

It may be concisely summarized as follows; the application of the present invention to large-capacity power stations facilitates the constant power-factor operation of a small-capacity power station, while that to small-capacity power stations facilitates the programmed operation of a large-capacity power station.

The further application of the present invention to all of the power stations existing in a power system completes the cross-current control system for the power system, so that a chain of power stations might be prevented from sequentially-stepping out of the power system, that is, from the so-called domino phenomenon which is caused by breaker-tripping of the overcurrent protective relaying systems. As the result, both of the regulating capability and the regulating reserve amply sufficient to stably-supply the consumers with the power of high quality are provided for the electric power system. The present invention thus enables one to operate a modern electric power system with effect and with economy.

We claim:

1. A method for controlling a current or power between interconnected power stations comprising:
   first step of measuring a deviation from a base load in an active current or power produced from a specific power station;
   second step of measuring a deviation from a normal value in the terminal voltage of said specific power station;
   third step of yielding a linear function of the ratio of said voltage deviation to said current or power deviation;
   fourth step of yielding a product of said function of ratio and an active current flowing out of an arbitrary power station interconnected with said specific power station;
   fifth step of yielding a resultant of said active current and a reactive current represented by said product;
   sixth step of summing up said resultant current and other currents of said power station including the internal load current; and
   seventh step of making the internal generation current of said power station coincident substantially with said sum of currents.

2. A method for controlling a current or power between interconnected power stations as claimed in claim 1, wherein said first step measures a deviation from a normal value in frequency appearing at said specific power station, and wherein said third step measures the linear function of the ratio of said voltage deviation to said frequency deviation.

3. A method for controlling the current or power between interconnected power stations as claimed in claim 1, wherein
   said first step measures a deviation from normal value in frequency of the active current appearing at the specific power station having a transmission line;
   said second step measures a deviation from a normal value in voltage appearing at receiving node of said transmission line;
   said third step yields a linear function of the ratio of said voltage deviation to said frequency deviation;
   said fourth step yields a product of said function of ratio and an active current flowing into said receiving-end node; and
   said fifth step includes a step of summing up a reactive current represented by said product and a reactive component of line-loss current associated with said power transmission and a step of yielding a resultant of said sum of reactive currents and an active current flowing out of sending-end node of said transmission line.

4. A method for controlling the current or power between interconnected power stations as claimed in claim 2 or 3, wherein said first step includes a step of measuring a deviation from base load in active current or power flowing out of a power station and a step of dividing said deviation by the difference between base and rated loads of said power station for normalization, and said third step includes a step of yielding a linear function of the ratio of said normalized active current or power deviation to a voltage deviation obtained from second step.

5. A method for controlling the current or power between interconnected power stations as claimed in claim 1, wherein
   said first step measures a deviation from normal value in frequency appearing at the specific power station having a set of transmission lines;
   said second step includes a step of obtaining a weighted average of voltage drops occurring on each of said transmission lines, and a step of measuring a deviation from normal valve in voltage represented by a resultant of said weighted average of voltage drops and the terminal voltage of said power station;
   said third step yielding a linear function of the ratio of said voltage deviation to said frequency deviation;
   said fourth step yielding a product of said function of ratio and a weighted average of active current flowing respectively into receiving end nodes of said transmission lines; and
   said fifth step including a step of summing up a reactive current represented by said product and a weighted average of reactive components of line loss currents occurring on each of said transmission lines, and a step of yielding a resultant of said sum of reactive currents and a weighted average of active currents flowing out of said power station respectively into sending end nodes of said transmission lines.

6. A method for controlling the current or power flowing between interconnected power stations as claimed in claim 5, wherein said first step includes a step of measuring a deviation from base load in active current or power flowing out of a power station and a step of dividing said deviation by the difference between base and rated loads of said power station for normalization, and said third step includes a step of yielding a linear function of the ratio of said normalized active current or power deviation to a voltage deviation obtained from said second step.

7. A method for controlling the current or power between interconnected power stations comprising:
   first step of measuring a deviation from base load in active current or power flowing out of a specific power station;

second step of measuring a deviation from normal value in the terminal voltage of said specific power station;

third step of yielding a linear function of the ratio of said voltage deviation to said current or power deviation;

fourth step of yielding a product of said function of ratio and an active current flowing out of an arbitrary power station interconnected with said specific power station;

fifth step of yielding a difference between a reactive current represented by said product and a reactive current flowing out of said power station; and sixth step of returning said difference to the internal generation current to form a negative feedback loop in the voltage-regulating system of said power station.

8. A method for controlling the current between interconnected power stations as claimed in claim 7, wherein said first step measures a deviation from a normal value in frequency appearing at said specific power station, and wherein said third step measures the linear function of the ratio of said voltage deviation to said frequency deviation.

9. A method for controlling the current or power between interconnected power stations as claimed in claim 8, wherein
said first step measures a deviation from normal value in frequency appearing at a power station having a transmission line;
said second step measures a deviation from normal value in voltage appearing at receiving node of said transmission line;
said third step yielding a function of the ratio of said voltage deviation to said frequency deviation;
said fourth step yielding a product of said function of ratio and an active current flowing into said receiving-end node; and
said fifth step yields a difference between a reactive current represented by said product and a reactive current flowing into said receiving-end node.

10. A method for controlling the current or power between interconnected power stations as claimed in claim 8 or 9, wherein said first step includes a step of measuring a deviation from base load in active current or power flowing out of a power station and a step of dividing said deviation by the difference between base and rated loads of said power station for normalization, and said third step includes a step of yielding a linear function of the ratio of said normalized active current or power deviation to a voltage deviation obtained from second step.

11. A method for controlling the current or power between interconnected power stations as claimed in claim 7, wherein
said first step measures a deviation from normal value in frequency appearing at the specific power station having a set of transmission lines;
said second step includes a step of obtaining a weighted average of voltage drops occurring on each of said transmission lines, and a step of measuring a deviation from normal value in voltage represented by a resultant of said weighted average of voltage drops and the terminal voltage of said power station;
said third step yielding a linear function of the ratio of said voltage deviation to said frequency deviation;

said fourth step yielding a product of said function of ratio and the active component of a weighted average of currents flowing respectively into receiving-end node of said transmission lines; and
said fifth step yielding a difference between a reactive current represented by said product and the reactive component of said weighted average of currents.

12. A method for controlling the current or power between interconnected power stations as claimed in claim 11, wherein said first step includes a step of measuring a deviation from base load in active current or power flowing out of a power station and a step of dividing said deviation by the difference between base and rated loads of said power station for normalization, and said third step includes a step of yielding a linear function of the ratio of said normalized active current or power deviation to a voltage deviation obtained from second step.

13. An apparatus for controlling the current or power produced from a power station connected to an electric power system comprising:
first means for detecting a deviation of system frequency from a reference;
second means for measuring a voltage at the terminal of said power station;
third means for measuring a set of currents flowing through individual circuits connected to said power station;
fourth means connected to said third means for simulating a power network to calculate a set of voltage drops and power losses due to transmission-line parameters and line currents of said power station;
fifth means connected to said fourth means for calculating a weighted average of said voltage drops;
sixth means connected to said second and fifth means for subtracting said weighted average voltage drop from said terminal voltage signal to provide a signal representative of a voltage at a specified load center;
seventh means connected to said sixth means for detecting a deviation of said load-center voltage from a reference;
eighth means connected to said first and seventh means for providing a linear function of the ratio of said load-center voltage deviation divided by said system-frequency deviation;
nineth means connected to said second and third means for converting said terminal voltage signal and said line-current signals into a set of signals representative of active powers flowing out of said power station;
tenth means connected to said fourth and nineth means for subtracting said active components of power losses from said active powers flowing into the corresponding transmission lines to provide a set of signals representative of active powers delivered to individual load centers;
eleventh means connected to said tenth means for calculating a weighted average of said active powers at individual load centers to provide a signal representative of an active power at a specified load center;
twelfth means connected to said eighth and eleventh means for multiplying said weighted average active power by said function of frequency to voltage deviation ratio to provide a signal representative of reactive power to be supplied to said specified load center;

thirteenth means connected to said fourth means for calculating a weighted average of said reactive components of power losses in transmission-lines;

fourteenth means connected to said twelfth and thirteenth means for adding said weighted average power loss to said reactive power load to provide a signal representative of a sending-end reactive power required by said specified load center;

fifteenth means connected to said nineth and fourteenth means for deriving a vector power from said sending-end active and reactive power signals;

sixteenth means connected to said second and fifteenth means for dividing said vector-power signal by said terminal voltage signal to provide a signal representative of a transmission-line current delivered to said specified load center;

seventeenth means connected to said second means for simulating an impedance circuit to calculate the internal load current due to the terminal voltage and the internal impedance of said power station;

eighteenth means connected to said third, sixteenth and seventeenth means for providing a signal representative of a magnitude of the vector sum of said transmission-line current, said internal load current and the rest of currents flowing out of said power station; and nineteenth means connected to said eighteenth means for delivering a signal corresponding to said signal provided by said eighteenth means to the voltage-regulating system of said power station so as to induce a specific electromotive force.

14. An apparatus for controlling the current or power produced from a power station connected to an electric power system comprising:

first means for detecting a deviation of system frequency from a reference;

second means for measuring a voltage at the terminal of said power station;

third means for measuring a set of currents flowing through individual circuit connected to said power station;

fourth means connected to said third means for simulating a power network to calculate a set of voltage drops and power losses due to transmission-line parameters and line currents of said power station;

fifth means connected to said fourth means for calculating a weighted average of said voltage drops;

sixth means connected to said second and fifth means for subtracting said weighted average voltage drop from said terminal voltage signal to provide a signal representative of a voltage at a specified load center;

seventh means connected to said sixth means for detecting a deviation of said load-center voltage from a reference;

eighth means connected to said first and seventh means for providing a function of the ratio of said load-voltage deviation divided by said system-frequency deviation;

nineth means connected to said second and third means for converting said terminal voltage signal and said line-current signals, respectively, into a set of signals representative of active powers and a set of signals representative of reactive powers flowing out of said power station;

tenth means connected to said fourth and nineth means for subtracting said active and reactive components of power losses respectively from said active and reactive powers flowing into the corresponding transmission lines to provide a set of signals representative of active powers and a set of signals representative of reactive powers, both of which are delivered to individual load centers;

eleventh means connected to said tenth means for calculating a weighted average of said active powers and a weighted average of reactive powers at individual load centers to provide a set of a signal representative of an active power and a signal representative of a reactive power at a specified load center;

twelfth means connected to said eighth and eleventh means for multiplying said weighted average active power load by said function of frequency to voltage deviation ratio to provide a signal representative of reactive power supply desired by said specified load center;

thirteenth means connected to said eleventh and twelfth means for providing a difference between said delivered reactive power signal and said desired reactive power signal; and fourteenth means connected to said thirteenth means for delivering a signal corresponding to the signal provided by said thirteenth means to the voltage-regulating system of said power station so as to perform a negative feedback control for the induced voltage.

* * * * *